(12) United States Patent
Rudin

(10) Patent No.: US 6,522,382 B1
(45) Date of Patent: Feb. 18, 2003

(54) LIQUID CRYSTAL DISPLAY CELL AND METHOD OF OPERATING SAME

(75) Inventor: John Christopher Rudin, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/612,653

(22) Filed: Jul. 7, 2000

(30) Foreign Application Priority Data

Jul. 9, 1999 (EP) .............................................. 99305482

(51) Int. Cl.[7] .......................... G02F 1/1343; G02F 1/13; C09K 19/02
(52) U.S. Cl. ....................... 349/143; 349/139; 349/171; 349/187; 349/201
(58) Field of Search .......................... 349/34, 143, 139, 349/201, 171, 184, 187; 345/87

(56) References Cited

U.S. PATENT DOCUMENTS 5,905,557 A      5/1999   Yaniv ........................... 349/143
6,147,666 A   *  11/2000  Yaniv ........................... 345/87

FOREIGN PATENT DOCUMENTS

EP    0744041 B1   10/1997
WO    99/18474      4/1999

OTHER PUBLICATIONS

Bryan–Brown et al., Grating Aligned Bistable Nematic Devices, IDW '97, Defence Evaluation and Research Agency, pp. 261–264.*

Mike Towler, Future LC Technologies, Sharp Laboratories of Europe, Ltd., 1997, pp. 1–10.*

"Development of Super–TFT–LCDs with In–Plane Switching Display Mode" M. Ohta, M. Oh–e, K. Kondo. Electron Tube & Devices Div., Hitachi, LTD., Mobara, Japan.

"Alignment of Liquid Crystals by Grooved Surfaces". Dwight W. Berreman. Bell Laboratories, Murray Hill, New Jersey. Nov. 30, 1972.

"Mechanism and electrooptic properties of multi–domain vertically aligned mode" V.A. Konovalov, A.A. Muravski, S.N. Timofeev, and S.Ye. Yakovenko. Institute of Applied Physics Problems, Kurchatova 7, Minskm 220064, Belarus.

* cited by examiner

Primary Examiner—William L. Sikes
Assistant Examiner—Tarifur R. Chowdhury

(57) ABSTRACT

A liquid crystal cell includes a liquid crystal layer between upper and lower substrates. A series of insulating ridges forming a monograting structure overlay a first electrode overlaying the lower substrate. The ridges carry second electrodes connected together and displaced from the first electrode along the thickness dimension of the cell. The second electrodes lie within a "bulk region" of the liquid crystal bounded by the farthest extent reached by the liquid crystal in the thickness dimension. As the gap between electrodes is small, low drive voltages produce between the electrodes a significant electric field adjacent the surface.

34 Claims, 5 Drawing Sheets

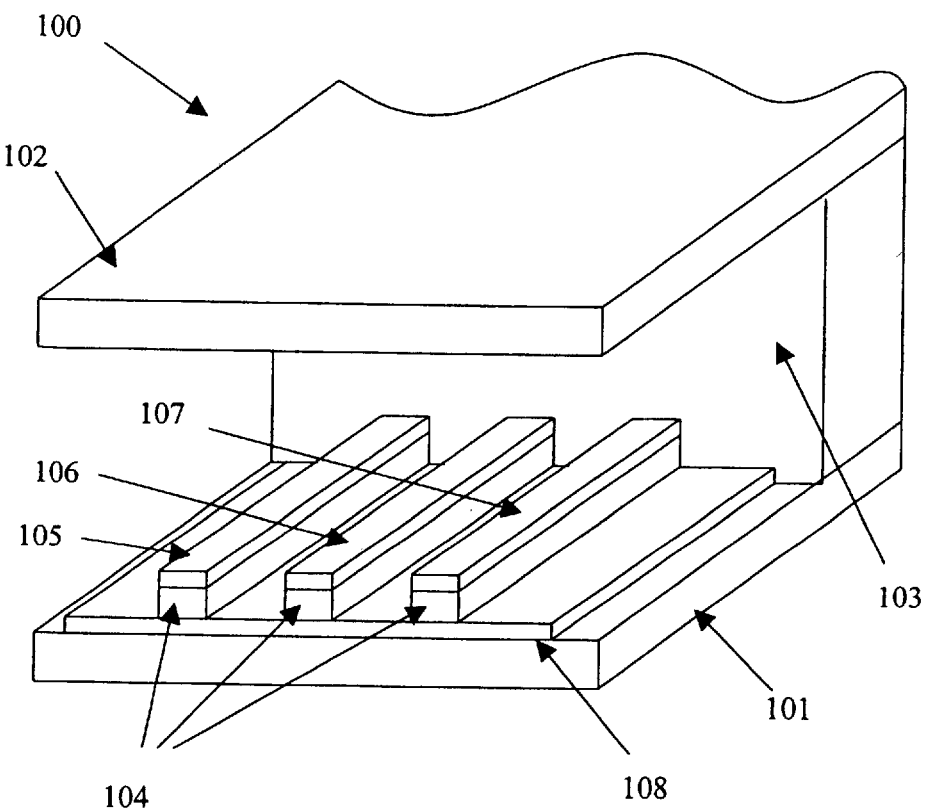
Figure 1
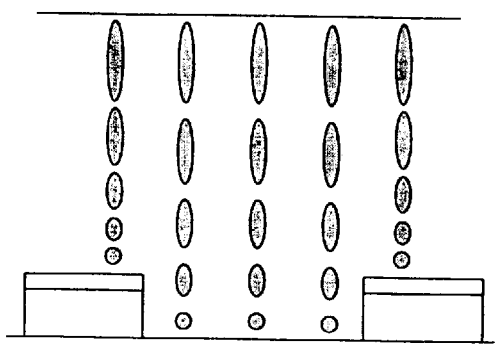 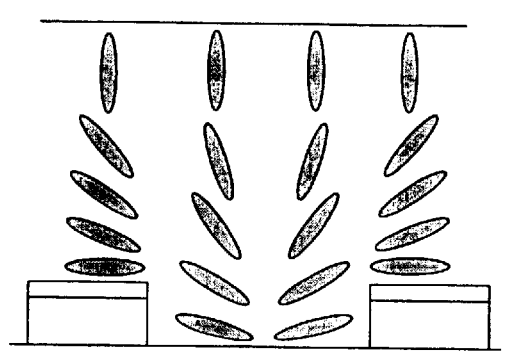
○ Director into page
Figure 2A                    Figure 2B 601　　　　　　　　　　　602 and even more, so that the topology of the electric field between electrodes can be controlled effectively.

LIQUID CRYSTAL DISPLAY CELL AND METHOD OF OPERATING SAME

FIELD OF INVENTION

This invention relates to a liquid crystal device.

DESCRIPTION OF PRIOR ART

Liquid crystal devices typically comprise a thin layer of a liquid crystal material sandwiched between substrates acting as cell walls. Optically transparent electrode structures on the walls allow an electric field to be applied across the layer, causing a re-alignment of the liquid crystal molecules.

Many different modes of liquid crystal devices are known in the art. Examples of known device types are the twisted nematic device, the cholesteric phase change device, the dynamic scattering device, the supertwisted nematic device and the surface stabilised ferroelectric device. It is well known in all of these device modes to provide a surface on the interior walls of the device which will control the alignment of the liquid crystal fluid in close proximity to the surface. The surface or surfaces may provide only one stable alignment of the liquid crystal within the cell, in which case the device is termed "monostable". If two or more zero-field alignments are afforded, the device is termed "multistable". In general where only two stable alignments, whose optical properties are significantly different, are obtained, devices are termed "bistable".

The class of bistable nematic devices can be sub-divided into "azimuthal", "zenithal" and "twisted" types. In "azimuthal" types, the switching between the stable states requires a general rotation of the liquid crystal bulk director in the plane of the substrates, whereas in "zenithal" types this movement is in a plane normal to the substrates surface. For "twisted" types, the movement between states is characterised by a significant change in the nematic director twist angle through the device about an axis normal to the substrates.

The liquid crystal may be realigned by use of electric fields applied between the electrodes on the cell walls. For liquid crystals with positive dielectric anisotropy, the result is alignment parallel to the field, whereas for liquid crystals with negative dielectric anisotropy, the result is alignment normal to the field.

For bistable and multistable devices, a key issue is switching between two different stable states—this should not occur uncontrollably, but should be reliable, repeatable, and should require little power. Switching is accomplished by realigning liquid crystals through the electric fields between electrodes. In standard cells, this realignment is a bulk effect, and it requires higher electric fields than is desirable to work efficiently.

Other approaches have been tried. Ohta et al, in "Development of Super-TFT LCDs with In Plane Switching Display Mode", IDRC 95, p707, proposes use of two different electrodes interdigitated on a single substrate. International Patent Publication No. WO 81/01618 teaches use of different electrodes on a single substrate to achieve more than one field geometry. Such approaches have had problems in effective application. The electrode density is important for in-plane switching to be effective, but it is limited by the tendency for shorting between opposed conductors to occur, because such shorting results in the failure of the pixel concerned.

A further modification beneficial in aligning liquid crystals at a cell surface is to introduce topographic features of a microscopic scale. This approach has been followed for monostable alignment (discussed in Cheng, J., Boyd, G. D., Applied Physics Letters, Vol. 35, p1326, 1970) and for bistable alignment (see European Patent Publication No. 0744041). Use of a grating structure is discussed in "The Alignment of Liquid Crystals by Grooved Surfaces", D. W. Berreman, Mol. Liq. Cryst. 23, pp 215–231, 1973. Use of such topographic features allows control of the ordering of the liquid crystal at the surface. More recently (as summarised in Konovalov et al, Asia Display 98, p379), the dielectric effect of larger scale surface features on the field geometry has been used to allow consistent alignment of Vertically Aligned Nematic (VAN) modes.

A key problem still remains in that in conventional arrangements, the effect of an applied electric field is realised mainly in the bulk, and a large bulk effect is required to change the alignment of the director near or at the surface. Consequently high voltages are required to generate such high fields across the cell, and control of switching could be usefully improved.

SUMMARY OF INVENTION

Accordingly, the invention provides a liquid crystal display cell, comprising: a liquid crystal layer having a thickness dimension and a bulk region bounded by first and second limits of extent of the liquid crystal layer in the thickness dimension; first and second electrode structures disposed for orienting liquid crystals in the liquid crystal layer; wherein said first and second electrode structures are displaced with respect to each other in said thickness dimension, and wherein at least one of the first and second electrode structures lies within the bulk region.

This has a number of advantages. As the vertical gap between electrodes is small, low drive voltages are needed to give a significant field between them (moreover, in preferred constructions a barrier layer can readily be used to protect the electrodes from each other). Moreover, this field is located in the region in which it can be particularly effective—adjacent to the surface. Electrodes can be patterned at high resolution without risk of shorting (because of the vertical displacement). Considerable control can be made of the topology of electric fields resulting, which can have important significance as the relationship of electric field direction to liquid crystal director is of central importance to effective switching. This relationship provides the torques experienced by the liquid crystal, and as these torques are provided near the surface (rather than in the bulk of the liquid crystal), they are faster acting and more effective. Yet a further advantage is that designs can be made which result in little or no electric field acting on the bulk, which can be beneficial as electric fields can affect liquid crystal optical properties.

Preferably, the first electrode structure lies adjacent to the bulk region and the second electrode structure lies within the bulk region: a particularly practical arrangement is for the first electrode structure to be formed on a first substrate and lie between the first substrate and the bulk region, with the second electrode formed on a raised structure formed on the first substrate and extending into the bulk region. This raised structure may have the same role as existing microscopic topographic structures do, of aligning the liquid crystal. The raised structure can thus be an array of ridges, but a new and useful alternative is to provide the raised structure as a layer perforated by an array of holes extending to the first electrode structure.

There may also be a third electrode structure on the opposite cell surface, and even a fourth electrode structure— the third and fourth electrode structures may have essentially the same types of features of first and second electrode structures. A useful approach, if there are first, second, third and fourth electrode structures, is for orthogonal liquid crystal alignments (by raised structures for liquid crystal alignment or otherwise) to be favoured at the two surfaces.

The present invention is particularly useful for nematic liquid crystals, both in cells that have a monostable or bistable (either zenithal or azimuthal) alignment without electric field.

DESCRIPTION OF FIGURES

Specific embodiments of the invention are described below, by way of example, with reference to the accompanying Figures, in which:

FIG. 1 shows a first embodiment of a liquid crystal cell according to the invention, with the liquid crystal shown partially removed to reveal surface structures;

FIGS. 2A and 2B show director profiles for a nematic liquid crystal in the liquid crystal cell of FIG. 1 under different field conditions;

DESCRIPTION OF SPECIFIC EMBODIMENTS

Figure 3A:
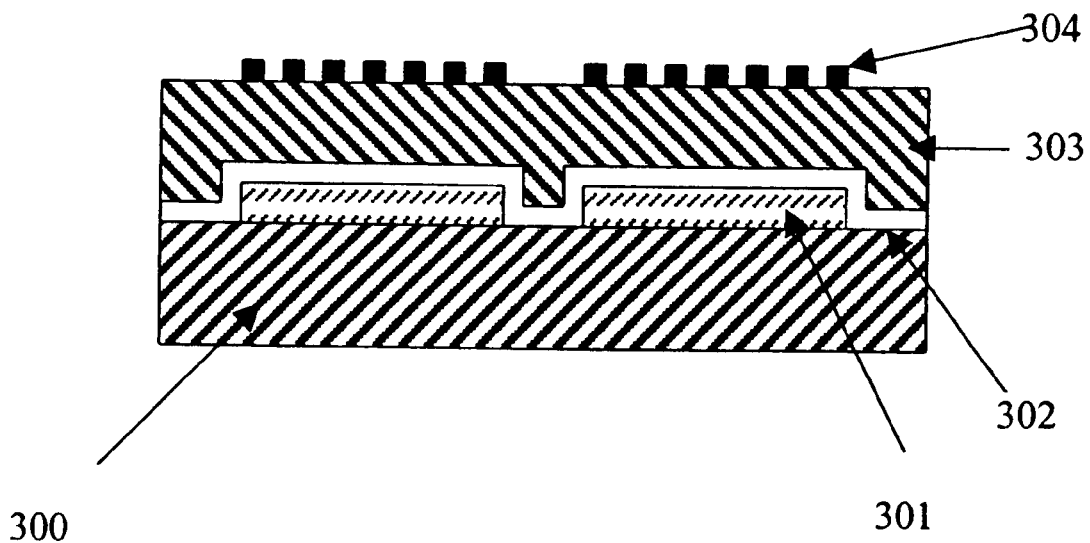
FIGS. 3A and 3B show stages in the manufacture of a liquid crystal cell according to a second embodiment of the invention.

FIG. 1 shows a liquid crystal display cell 100 according to the first embodiment of the invention. The cell 100 is bound by two substrates 101, 102. Between the two substrates is a thickness of liquid crystal—this liquid crystal layer 103 is shown removed from the front part of the cell to reveal the structures on the two substrates 101, 102. Laid over the lower substrate 101 is a first electrode structure 108. Over this electrode structure are laid a series of ridges 104 of insulating material—these ridges form a monograting structure to promote planar homogeneous alignment on that substrate, as discussed in Berreman (referenced above). On the ridges are formed second electrode structures 105, 106, 107. The second electrode structures (which are connected together) are thus displaced from the first electrode structure 108 along the thickness dimension of the cell—as the liquid crystal 103 extends down to the first electrode structure 108, the second electrode structures 105, 106, 107 can be considered to lie within a "bulk region," of the liquid crystal bounded by the farthest extent reached by the liquid crystal in this thickness dimension.

The cell shown in FIG. 1 has no monograting structure on the second substrate 102, and this substrate may beneficially be treated with a homeotropic alignment agent (as described, for example, in "Surface Induced Molecular Orientation of Liquid Crystals by Carboxatochromium Complexes", Masumoto et al, App. Phys. Lett., Vol. 27(5), Sep. 1, 1975) to form a Hybrid Aligned Nematic (HAN) arrangement. A HAN device is homeotropic at one surface, but has some form of planar orientation at the other surface.

In the arrangement shown in FIG. 1, the orientation of the liquid crystal in the relaxed state without electric field, as shown by the liquid crystal director profile, is shown in FIG. 2A—alignment at the grooved surface is aligned with the grooves formed by the grating structure. The orientation changes from planar alignment imposed by the monograting 104, to homeotropic alignment at the other surface 102. However, if a voltage is imposed as follows, $$V_1 \neq V_2$$

where $V_1$ is the potential on the second electrodes 105, 106, 107 and $V_2$ is the potential on the first electrode 108, where these potentials are sufficient to realign the liquid crystal, then the director profile will change to that shown in FIG. 2B, with a corresponding change in the optical transmission of polarised light. Where potential is applied, there is a field-induced change from the groove-aligned orientation of FIG. 2A to a new orientation with alignment of the liquid crystal substantially orthogonal to the grooves.

Figure 3B:
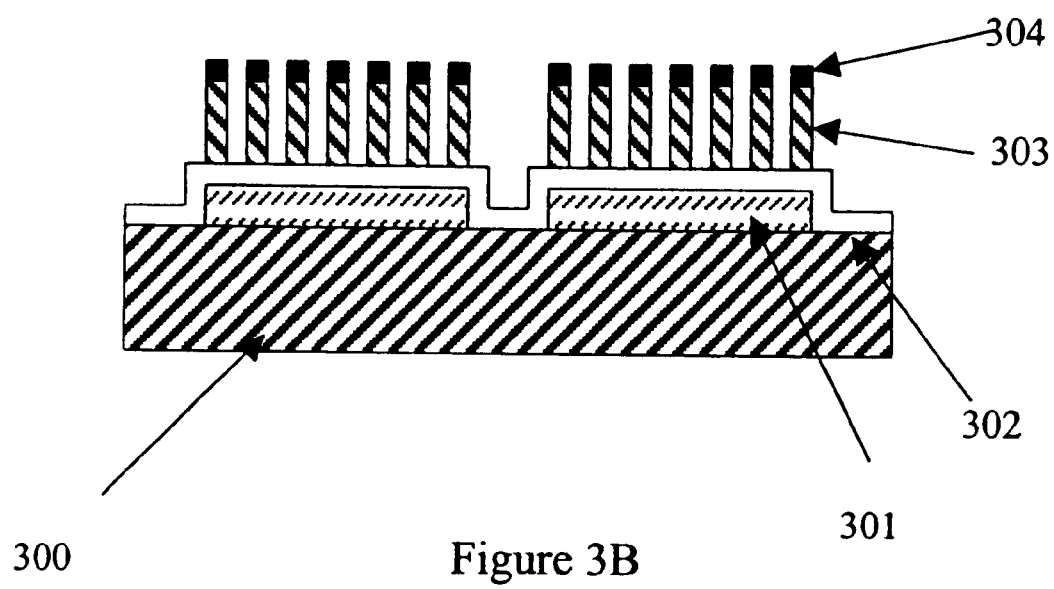

An example of a method of forming cells of this type is described below with reference to FIGS. 3A, 3B and 4. The cell formed is according to a second embodiment of the invention, but minor variations of this approach of a kind obvious to the person skilled in the art can be used to achieve cells of the other embodiments here described.

An indium tin oxide (ITO) coated glass substrate 300 is patterned by conventional photolithographic methods to form electrodes 301 on its surface with a coarse pattern. The whole surface of the substrate is then coated with an insulating barrier layer 302 (e.g. by chemical vapour deposition coating of 15 nm of SiON). Over this is spincoated a transparent polymer dielectric layer 303 of a thickness compatible with topographic liquid crystal alignment features (e.g. Shipley P-150 Novolac resin heat cured in vacuum at 235° C. for 1 hour to give a thickness of 0.5µm). A transparent conductor layer is then deposited over the dielectric layer 303 (e.g. 40 nm of ITO deposited by standard ion enhanced evaporation or RF sputtering and annealed in nitrogen for 180° C. for 1 hour) and patterned by normal photolithographic techniques—a positive photoresist and UV mask patterning—to form a linked monograting pattern, with submicron scale lines and spaces. This patterned layer is then etched by Reactive Ion Etching (RIE) (e.g. using $CH_4/H_2$ reactive gas mix) to form a second set of electrodes 304. After the second set of electrodes 304 has been defined, it is necessary to remove surplus photoresist. This leaves the arrangement shown in FIG. 3A.

The next step is for the pattern of electrodes 304 to be etched down into the dielectric layer 303. A further selective anisotropic RIE process (e.g. using $CHF_3/O_2$ reactive gas mix) is used to etch away all exposed dielectric down to the insulating barrier layer 302. The dielectric layer 303 is thus formed into the same pattern structure as that of the electrodes 304. This pattern structure is designed as a monograting to define a stable alignment structure for liquid crystal at this surface. The arrangement at this point, with first substrate 300 fully treated, is as shown in FIG. 3B.

Figure 4:
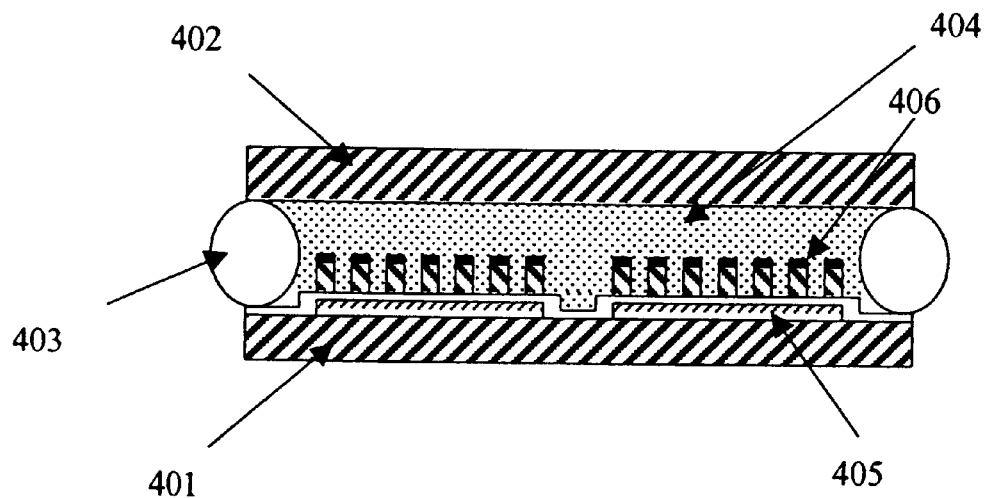
FIG. 4 shows the completed liquid crystal cell according to the second embodiment of the invention.

A complete cell using such a structure is shown in FIG. 4. The treated substrate 300 of FIG. 3B is equivalent to substrate 401 of FIG. 4, which has first electrode layer 405 and second electrode layer 406. The opposed substrate 402 is plain glass, treated with a chrome complex homeotropic treatment (as described in the Masumoto reference given above). The substrates 401, 402 are spaced 3–5 µm apart by spacer beads 403, and a nematic liquid crystal such as E. Merck ZLI-2293 is used to fill the cell, providing a liquid crystal layer 404. The liquid crystal is advantageously doped with a surfactant to lower anchoring energy as discussed in International Patent Application Publication No. WO 99/18474.

Figure 5:
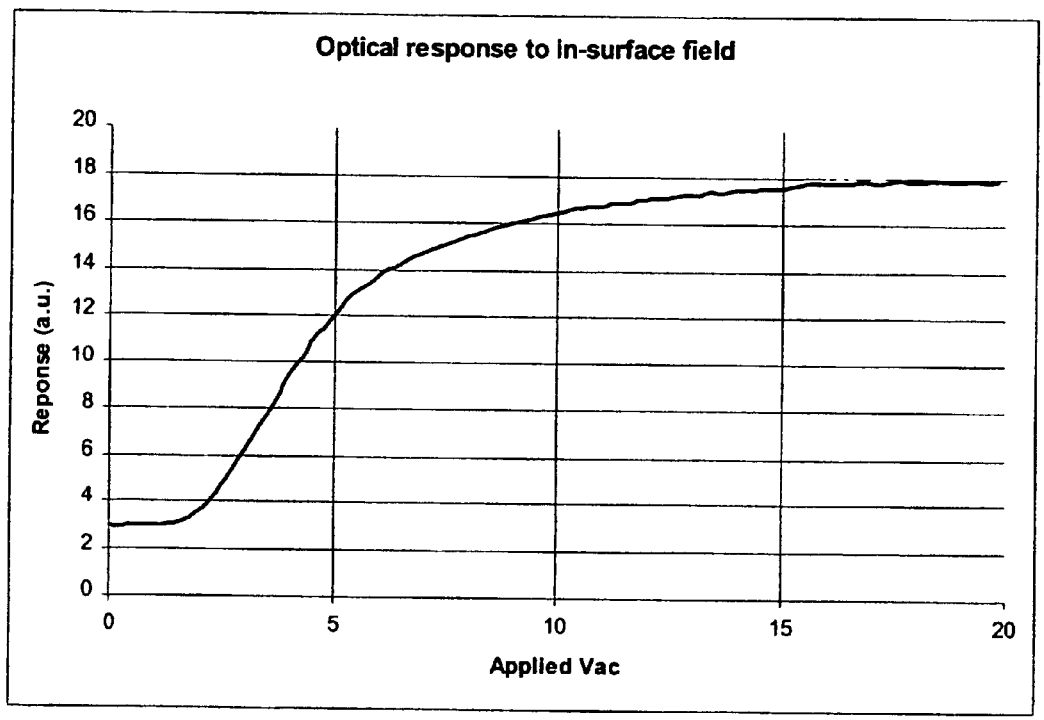
FIG. 5 shows a transmission characteristic of the liquid crystal cell of FIG. 4.

The cell of FIG. 4 is monostable. When placed between crossed polarisers the device will not transmit light in the relaxed state (that is, with no voltage applied), but will transmit light when a voltage is applied between the electrodes 405 and 406, with a transmission characteristic as shown in FIG. 5.

Figure 6:
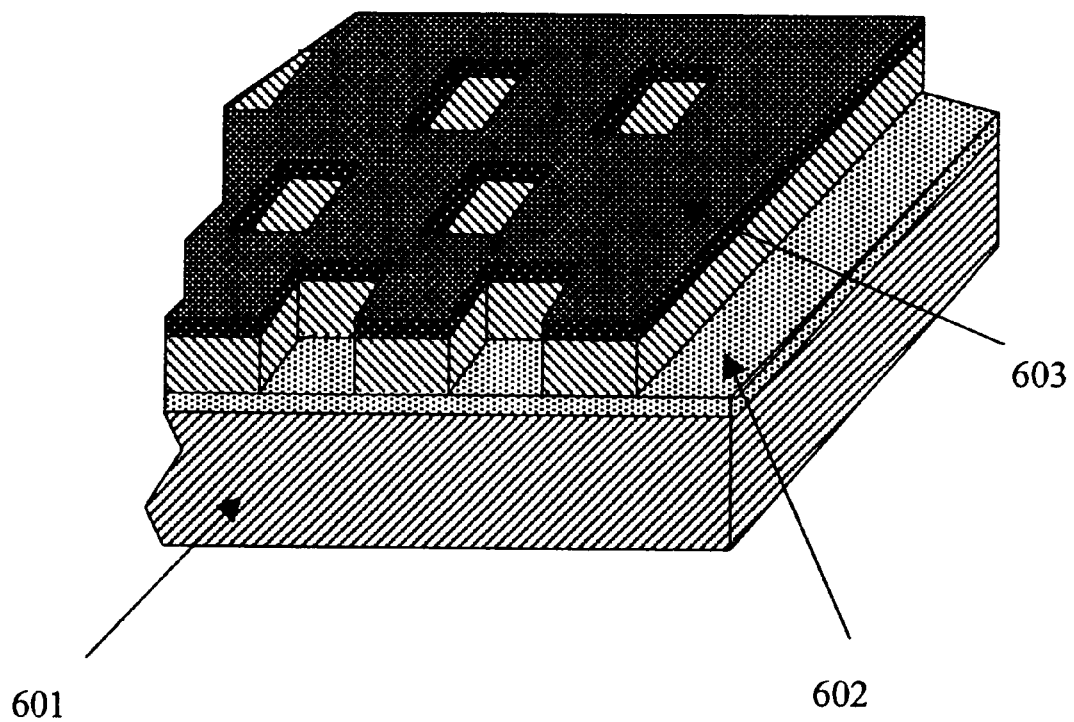
FIG. 6 shows a substrate surface for a liquid crystal cell according to a third embodiment of the invention.

With different patterning of the electrodes (and hence of the dielectric layer) different cell types can be formed. The second embodiment of the invention, shown in FIG. 6, illustrates such a different cell type. With the same method steps, but with a different mask pattern for the second electrode 603, substrate 601 can be provided with a first electrode 602 substantially as in the previous embodiment but with a second electrode 603 (and dielectric layer) which contains a regular array of rectangular holes. This array of holes is such to stabilise two orthogonal orientations of the nematic liquid crystal at the surface—this is a bistable arrangement.

Figure 7:
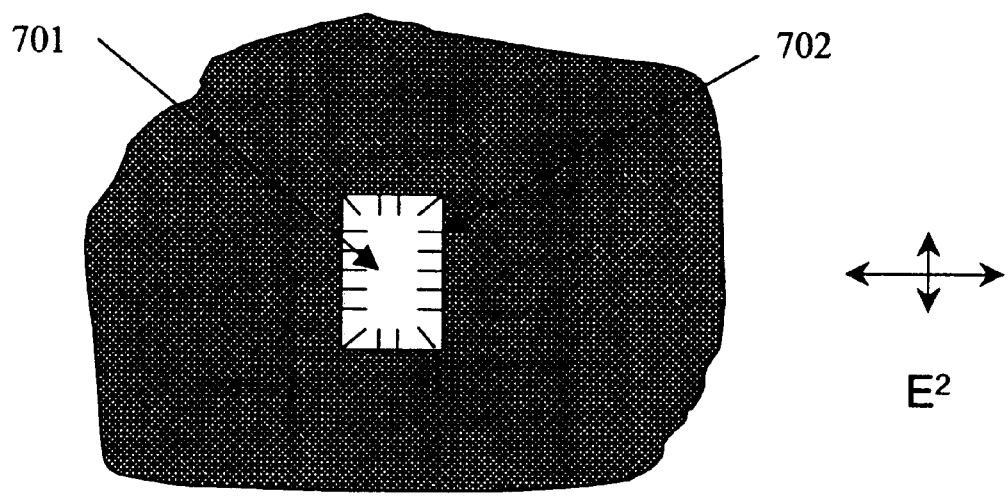
FIG. 7 shows electric field anisotropy resulting from the structure of FIG. 6.

The effect of electric field with structures of this type is shown in FIG. 7. FIG. 7 shows a structure with a rectangular recess 701 in a top electrode with a lower electrode underneath, together with the resulting field lines 702. This field is anisotropic: for a nematic liquid crystal in or around the recess this will result in a net torque normal to the longer dimension of the recess. Such a field can thus be used to switch the nematic liquid crystal between the two stable states.

The FIG. 7 structure can be used in a HAN device as shown in FIG. 1. However, in a preferred full device using structures as shown in FIG. 6 and according to this second embodiment, both substrates are provided with a similar pattern (so each surface has two electrodes with the second electrode arranged with a regular array of rectangular recesses). However, the second substrate is arranged with its orientation orthogonal to that of the first substrate. With this overall cell arrangement, an azimuthal bistable nematic cell results. By appropriate choice of electrode voltage, switching between either of the stable states for this device can be achieved—the stable states are orthogonal to each other, and are achieved by a rotation through 90 degrees of a whole liquid crystal stack.

Figure 8:
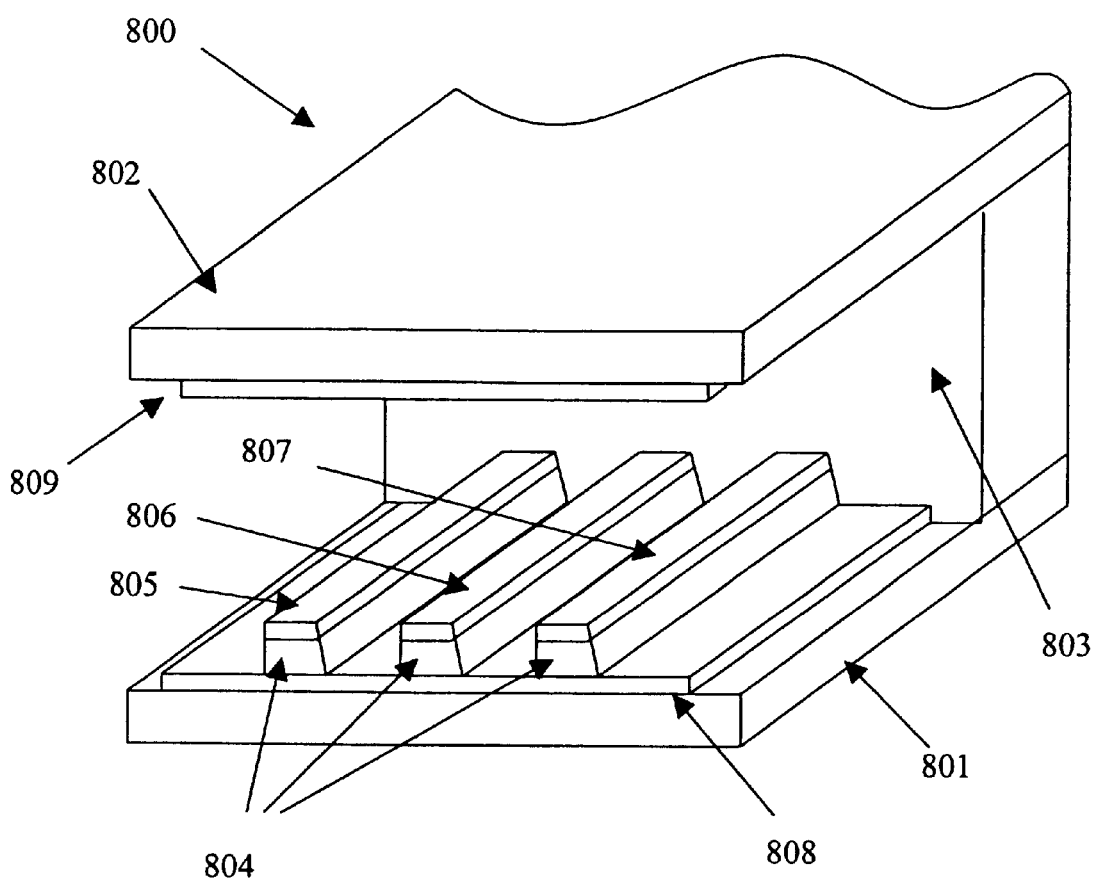
FIG. 8 shows a liquid crystal cell according to a fourth embodiment of the invention.

A third embodiment of this invention is shown in FIG. 8. This device 800 is similar to the arrangement of FIG. 1, in that it contains two substrates 801, 802, one of which is patterned with electrodes 808 and 805, 806, 807 with the electrodes vertically separated by means of a grating structure 804, and the other of which has an additional electrode 809 and a homeotropic agent to promote homeotropic alignment, with liquid crystal 803 between the substrates. However, in this case, the grating structure 804 is asymmetric, rather than symmetric. This can be achieved by variation of the etch of the dielectric layer (after formation of the second electrode 805, 806, 807)—such variation can be realised by use of an offset angle RIE process (e.g. tilting the substrate in the process chamber). The result is a zenithal bistable nematic structure, as described in for example International Patent Application Publication No. WO97/14990.

Again, switching between the two stable states can be achieved by appropriate potential differences between the three electrodes. The two stable states are the "near homeotropic state" and the "splayed HAN state". In the "near homeotropic state", the liquid crystal has an orientation which is close to homeotropic at the lower surface (and homeotropic at the upper surface) in the arrangement depicted. In the "splayed HAN state", the liquid crystal aligns in a planar fashion—the net tilt on the grating causes the liquid crystal to relax into one preferred alignment (of the two alternatives that would be available if there was no tilt). If V1 is the voltage on electrodes 805, 806, 807, V2 is the voltage on counter electrode 808, and V3 is the voltage on the additional electrode 809 on the other substrate, then relaxation into the near homeotropic state can be achieved by setting $$V2 \neq V3 (V1 \text{ may be left floating})$$

and relaxation into the splayed HAN state may be achieved by setting $$V1 \neq V2 = V3,$$

provided in each case that a sufficient voltage is used. However, the "sufficient voltage" in this case, particularly in respect of the transition to the splayed HAN state, is much less than in conventional structures.

Further embodiments of the invention which realise liquid crystal cells of any of these types (monostable and multi-stable nematic) or others can be achieved by the person skilled in the art through modifications of the methods and devices indicated here.

What is claimed is:

1. A liquid crystal display cell, comprising:
   a liquid crystal layer having a thickness dimension and a bulk region bounded by first and second limits of extent of the liquid crystal layer in the thickness dimension;
   first and second electrode structures disposed for orienting liquid crystals in the liquid crystal layer;
   wherein said first and second electrode structures are displaced with respect to each other in said thickness dimension, and wherein at least one of the first and second electrode structures protrudes in the thickness direction into the bulk region.

2. A liquid crystal display cell as claimed in claim 1, wherein the first electrode structure lies adjacent to the bulk region and the second electrode structure lies within the bulk region.

3. A liquid crystal display cell as claimed in claim 2, wherein the first electrode structure is formed on a first substrate and lies between the first substrate and the bulk region, and wherein the second electrode is formed on a raised structure formed on the first substrate and extending into the bulk region.

4. A liquid crystal display cell as claimed in claim 3, wherein the raised structure is a topographical structure for liquid crystal alignment.

5. A liquid crystal display cell as claimed in claim 4, wherein the raised structure comprises an array of ridges.

6. A liquid crystal display cell as claimed in claim 5, wherein the ridges in said array of ridges are each asymmetric about a plane parallel to the thickness dimension and containing a crest of the ridge.

7. A liquid crystal display cell as claimed in claim 4, wherein the raised structure consists of a perforated layer, the perforated layer being perforated by an array of holes extending to the first electrode structure.

8. A liquid crystal display cell as claimed in claim 2, further comprising a third electrode structure lying adjacent to the bulk region on a side of the liquid crystal layer remote from the first electrode structure.

9. A liquid crystal display cell as claimed in claim 8, further comprising a fourth electrode structure, wherein the third electrode structure is formed on a second substrate and lies between the second substrate and the bulk region, and wherein the fourth electrode is formed on a further raised structure formed on the second substrate and extending into the bulk region.

10. A liquid crystal display cell as claimed in claim 9, wherein the further raised structure is a topographical structure for liquid crystal alignment.

11. A liquid crystal display cell as claimed in claim 10, wherein the further raised structure comprises an array of ridges.

12. A liquid crystal display cell as claimed in claim 11, wherein the ridges in said array of ridges are each asymmetric about a plane parallel to the thickness dimension and containing a crest of the ridge.

13. A liquid crystal display cell as claimed in claim 10, wherein the further raised structure consists of a perforated layer, the perforated layer being perforated by an array of holes extending to the first electrode structure.

14. A liquid crystal display cell as claimed in claim 10, wherein the raised structure is adapted to impose liquid crystal alignment in a first alignment direction, and the further raised structure is a adapted to impose liquid crystal alignment in a second alignment direction, and the first alignment direction and the second alignment direction are orthogonal.

15. A liquid crystal display cell as claimed in claim 1 where liquid crystal in the liquid crystal layer is in a nematic phase.

16. A liquid crystal display cell as claimed in claim 1 where a director profile of the liquid crystal is monostable in the absence of electrical field between any of the electrodes.

17. A liquid crystal display cell as claimed in claim 1 where a director profile of the liquid crystal is multistable in the absence of electrical field between any of the electrodes.

18. A liquid crystal display cell as claimed in claim 17, wherein the liquid crystal display cell is of the zenithal bistable nematic type.

19. A liquid crystal display cell as claimed in claim 17, wherein the liquid crystal display cell is of the azimuthal bistable nematic type.

20. A liquid crystal display cell, comprising:
a liquid crystal layer having a thickness dimension and a bulk region bounded by first and second limits of extent of the liquid crystal layer in the thickness dimension; and
first and second electrode structures disposed for orienting liquid crystals in the liquid crystal layer;
said first and second electrode structures being substantially parallel to each other and displaced with respect to each other in said thickness dimension, and at least one of the first and second electrode structures protrudes in the thickness direction into the bulk region.

21. A liquid crystal display cell as claimed in claim 20 wherein the first and second electrode structures cover substantially all of an area of the first substrate orthogonal to the thickness dimension and adjacent to the liquid crystal layer.

22. A liquid crystal display cell as claimed in claim 20, wherein the first electrode structure lies adjacent to the bulk region and the second electrode structure lies within the bulk region.

23. A liquid crystal display cell as claimed in claim 22, wherein the first electrode structure is formed on a first substrate and lies between the first substrate and the bulk region, and wherein the second electrode is formed on a raised structure formed on the first substrate and extending into the bulk region.

24. A liquid crystal display cell as claimed in claim 23, wherein the raised structure is a topographical structure for liquid crystal alignment.

25. A liquid crystal display cell as claimed in claim 24, wherein the raised structure comprises an array of ridges.

26. A liquid crystal display cell as claimed in claim 25, wherein each of the ridges in said array of ridges is asymmetric about a plane parallel to the thickness dimension and including a crest of the ridge.

27. A liquid crystal display cell as claimed in claim 24, wherein the raised structure includes a perforated layer, the perforated layer being perforated by an array of holes extending to the first electrode structure.

28. A liquid crystal display cell as claimed in claim 22, further comprising a third electrode structure lying adjacent to the bulk region on a side of the liquid crystal layer remote from the first electrode structure.

29. A liquid crystal display cell as claimed in claim 28, further comprising a fourth electrode structure, the third electrode structure being formed on a second substrate and lying between the second substrate and the bulk region, the fourth electrode structure being formed on a further raised structure formed on the second substrate and extending into the bulk region.

30. A liquid crystal display cell as claimed in claim 29, wherein the further raised structure includes a topographical structure for liquid crystal alignment.

31. A liquid crystal display cell as claimed in claim 30, wherein the raised structure is adapted to impose liquid crystal alignment in a first alignment direction, and the further raised structure is adapted to impose liquid crystal alignment in a second alignment direction, and the first alignment direction and the second alignment direction are orthogonal.

32. A liquid crystal display cell as claimed in claim 20, wherein the liquid crystal in the liquid crystal layer is in a nematic phase.

33. A method of switching a liquid crystal display cell comprising a liquid crystal layer having a thickness dimension and a bulk region bounded by first and second limits of extent of the liquid crystal layer in the thickness dimension and first and second electrode structures displaced with respect to each other in said thickness dimension, and wherein at least one of the first and second electrode structures protrudes in the thickness direction into the bulk region, comprising:
placing no voltage between the first electrode structure and the second electrode structure, with the liquid crystal layer aligned according to a first director profile;
placing sufficient voltage between the first electrode structure and the second electrode structure to realign the liquid crystal to a second director profile; and
removing the voltage between the first electrode structure and the second electrode structure with the liquid crystal aligned according to the second director profile.

34. A method as claimed in claim 33, wherein the liquid crystal display cell further comprises a third electrode structure lying adjacent to the bulk region on a side of the liquid crystal layer remote from the first electrode structure, and wherein the step of placing sufficient voltage between the first electrode structure and the second electrode structure comprises establishing a voltage relationship between the first electrode structure, the second electrode structure and the third electrode structure sufficient to realign the liquid crystal to a second director profile.

* * * * *